US007023265B1

(12) United States Patent
Helard et al.

(10) Patent No.: US 7,023,265 B1
(45) Date of Patent: Apr. 4, 2006

(54) EQUALIZING METHOD IN RECEIVERS USING A COMBINATION OF MULTIPLE CARRIER AND CODE DIVISION MULTIPLE ACCESS MODULATING TECHNIQUES

(75) Inventors: Jean-Francois Helard, Rennes (FR); Jean-Yves Baudais, Rennes (FR)

(73) Assignees: France Telecom, Paris (FR); Mitsubishi Electric, Rennes (FR); Telediffusion de France, Paris Cedex (FR)

( * ) Notice: Subject to any disclaimer, the term of this patent is extended or adjusted under 35 U.S.C. 154(b) by 207 days.

(21) Appl. No.: 10/088,284

(22) PCT Filed: Sep. 14, 2000

(86) PCT No.: PCT/FR00/02555

§ 371 (c)(1),
(2), (4) Date: Feb. 24, 2003

(87) PCT Pub. No.: WO01/20840

PCT Pub. Date: Mar. 22, 2001

(30) Foreign Application Priority Data

Sep. 14, 1999 (FR) .................................. 99 11689
Dec. 9, 1999 (FR) .................................. 99 15919

(51) Int. Cl.
*H04K 1/10* (2006.01)
(52) U.S. Cl. .................. 329/320; 375/260; 375/267; 375/229; 370/210
(58) Field of Classification Search ............... 375/260, 375/267, 229; 370/210; 329/320
See application file for complete search history.

(56) References Cited

U.S. PATENT DOCUMENTS 6,154,443 A * 11/2000 Huang et al. ............... 370/210

OTHER PUBLICATIONS

Jeon et al.. "An Equalization technique for OFDM and MC-CDMA in a Time-varying Multipath Fading Channels" IEEE International Conference on Acoustics, Speech and Signal Processing vol. 3, Apr. 21-24, 1997 pp 2529-2532.*
"A Multiuser Interference Cancellation Technique Utilizing Convolutional Codes and Orthogonal Multicarrier Modulation for Wireless Indoor Communications" by Yukitoshi Sanada, *IEEE Journal on Selected Areas in Communication* XP 000635677, pp. 1500-1508 vol. 14, No. 8, Oct. 1996.
"An Equalization Technique for OFDM and MC-CDMA in a Time-Varying Multipath Fading Channels" by Won Gi Jeon et al., IEEE XP-002139576, pp. 2529-2532, 1997.

(Continued)

*Primary Examiner*—Michael B Shingleton
(74) *Attorney, Agent, or Firm*—Westman, Champlin & Kelly (57) ABSTRACT

The invention concerns a method for receiving a signal using a multiple carrier and code division multiple access modulation, comprising a demodulating step by application of a mathematical transform of the temporal domain to the frequency domain, a step which consists in equalizing the transformed signal and a step which consists in despreading the equalized signal. The invention is characterised in that said equalizing step takes into account, for each of the components of said transformed signal, perturbations affecting the carrier bearing said component and at least one other of said carriers and at least some of said spread codes.

20 Claims, 4 Drawing Sheets

OTHER PUBLICATIONS

"A Comparison of Bidimensional RLS and LMS Equalizers for OFDM/DS Transmission in an Indoor Environment" by O. van de Wiel et al., IEEE XP 002032238, pp. 71-75, 1994.

"Performance of a OFDM-CDMA Systems with Orthogonal Convolutional Coding and Interference Cancellation" by R.A. Stirling-Gallacher et al., IEEE XP-000736730, pp. 860-864, Apr. 5, 1997.

* cited by examiner

EQUALIZING METHOD IN RECEIVERS USING A COMBINATION OF MULTIPLE CARRIER AND CODE DIVISION MULTIPLE ACCESS MODULATING TECHNIQUES

CROSS REFERENCE TO RELATED APPLICATIONS

This application is a 371 application of PCT/FR00/02555 filed Sep. 14, 2000 and published as WO 01/20840 on Mar. 22, 2001, not in English.

1. Field of the Invention

The field of the invention is that of transmission, and more precisely reception, of multi-carrier digital signals. The invention particularly concerns the equalisation, or detection, in receivers of signals relying on a combination of modulation techniques with multiple carriers and with multiple access by code division.

The development and adjustment of techniques making it possible to transfer multimedia data simultaneously at a high transfer rate for a large number of users is primordial for future generations of Hertzian communications, making it possible continually to satisfy better the constraints of spectral efficiency linked to the penury of the spectrum and to the growing number of users.

One known approach consists of searching for an optimum combination of modulation techniques for multiple carriers with high spectral efficiency (of the OFDM type) and the techniques of Code Division Multiple Access (CDMA type). These new techniques can for example be applied to mobile telecommunications systems (of the UMTS type and UMTS station) or to communications systems inside and outside buildings to increase the reliability and capacity of transmission.

2. State of the Art 2.1 Scientific Context

Since 1993, several contributions proposing a combination of modulation techniques for multiple carriers and spectrum spread have been published by several international teams [S. Hara, R. Prasad, "Overview of multicarrier CDMA" (IEEE Communications Magazine, December 1997, pp 126–166)]. Thus three families of transmission systems are known at present combining the OFDM and CDMA techniques:

the CDMA basic multicarriers MC-CDMA (Multi-Carrier CDMA),
the CDMA multi-pilots or MT-CDMA (Multi-Tone CDMA) and
the CDMA direct sequence multicarriers or MC-DS-CDMA (Multi-Carrier Direct-Sequence CDMA).

They are distinctive according to the way in which they combine OFDM and CDMA functions, through their spread technique or multiple access and by their frequency division.

The present invention relates in particular, but not exclusively, to the first of these families; CDMA multicarrier or MC-CDMA.

2.2 Description of an MC-CDMA System

Figure 1:
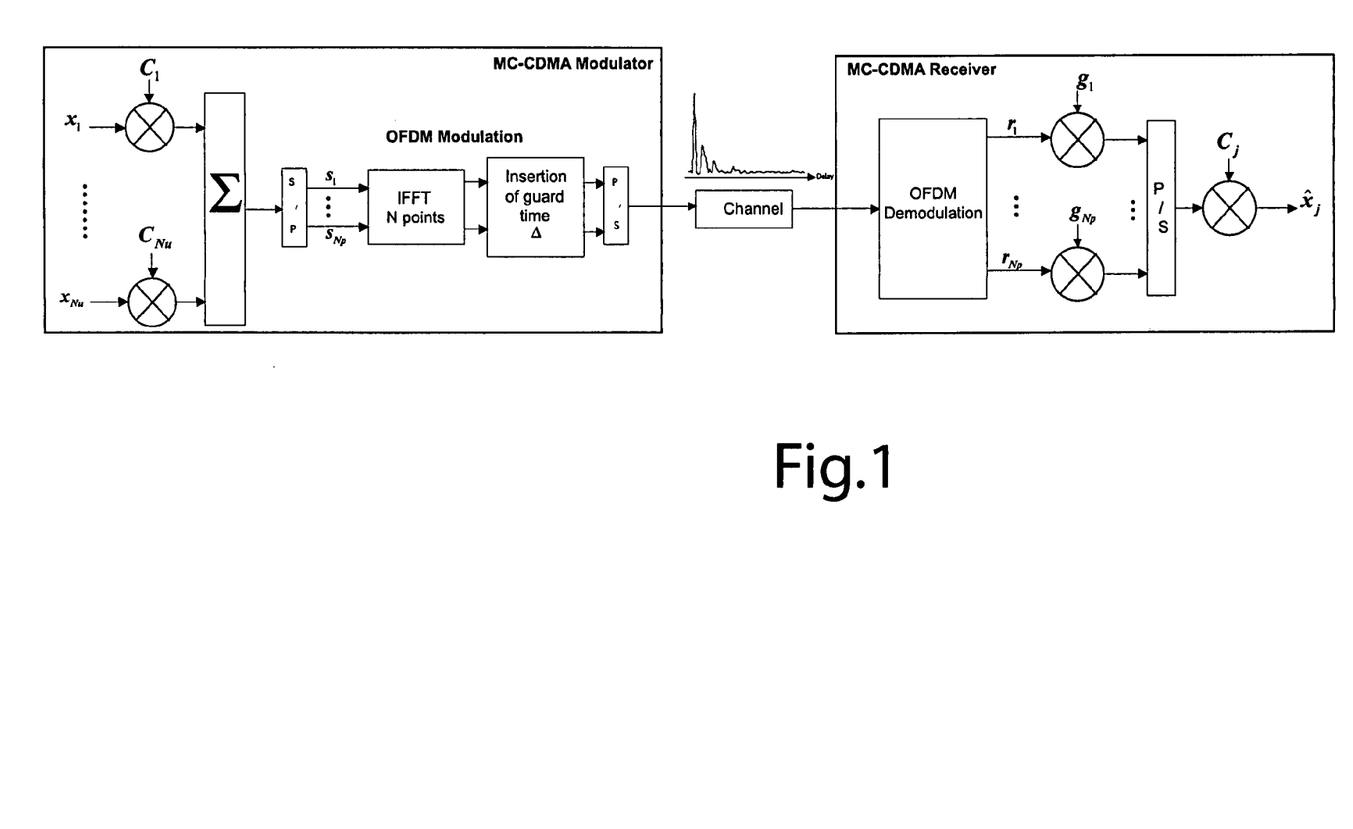
FIG. 1 shows a general overview diagram of an MC-CDMA transmission and reception channel, of known type.

In the MC-CDMA modulator shown in FIG. 1, and already known in prior art, the data flux is above all spread over the frequency field by using a spread code, and then transmitted on the different sub-carriers of the OFDM multiplex. A fraction of each data of origin, corresponding to a "chip" of the spread code of length $L_e$ is thus transmitted by each of the sub-carriers $N_p$.

Thus each symbol $x^n_j$ assigned to the user j (with j=1 ... $N_u$) and transmitted during the interval n, is multiplied by its specific spread code $C_j=[c_j^1, c_2^j, \ldots c_j^{Le}]^T$ of length $L_c$ where $[\ ]^T$ signifies a transposed vector.

The symbols vector transmitted during the $n^{th}$ MC-CDMA symbol by all the users can be written $X^n = [x^n_1, x^n_2, \ldots x^n_j \ldots x^n_{Lc}]^T$ with $x^n_j = 0$ when the user j is inactive. The matrix of the codes C is then equal to:

$$C = \begin{bmatrix} c_1^1 & c_2^1 & \ldots & c_{Lc}^1 \\ c_1^2 & c_2^3 & \ldots & c_{Lc}^2 \\ \ldots & \ldots & \ldots & \ldots \\ c_1^{Lc} & c_2^{Lc} & \ldots & c_{Lc}^{Lc} \end{bmatrix} \quad (1)$$

where the $j^{th}$ column vector of C corresponds to the spread code $C_j$ of the user j.

In the case of a downstream connection where the different signals addressed to the different users are emitted in a synchronous way, the codes used are generally chosen to be orthogonal, which makes it possible to obtain, in reception, better rejection of interference between users.

Thus, with Walsh-Hadamard codes, the maximum number of users is equal to the number of chips per code. In general, the number $L_c$ of chips of the spread code is chosen to be equal to the number $N_p$ of sub-carriers but variants are possible for better dimensioning of the generated signal relative to the transmission conditions (channel, cellular aspect etc.).

2.3 Detection Techniques 2.3.1 "Traditional" Techniques for Linear Equalisation

In an MC-CDMA receiver, the de-spreading is carried out in the frequency domain after operation of the Direct Fourier Transform implemented in the OFDM de-modulator as shown in FIG. 1.

The usage of orthogonal codes, such as the Walsh-Hadamard codes in the case of a synchronous system, guarantees the absence of multiple access interference in a Gaussian channel.

On the other hand, during transmission in a frequency selective channel, the orthogonality between the codes is destroyed which thus creates interference between users.

In the hypothesis that the length of the guard interval is longer than the spread of the impulsion response of the channel, and that the latter varies slowly relative to the length of the symbol, the channel effect on the $k_{th}$ sub-carrier can be approximated over the whole symbol length by a complex component called $h_k = \rho_k e^{i\theta_k}$.

In this case, the channel matrix is diagonal and equal to:

$$H = \begin{bmatrix} h_1 & \ldots & 0 & 0 \\ \ldots & h_2 & \ldots & 0 \\ 0 & \ldots & \ldots & \ldots \\ 0 & 0 & \ldots & h_{Np} \end{bmatrix} \quad (2)$$

By naming $N=[n_1, n_2, \ldots, n_{Np}]^T$ the vector representing the noise terms and $n_k$ the noise term affecting the $k^{th}$ sub-carrier $\tilde{n}_N^2 = E\{|n_g|^2\}$, k=1, ..., $N_p$, the vector obtained is then:

$$R = [r_1, r_2, \ldots, r_{Np}]^T = H.C.X + N \quad (3)$$

The matrix G of dimension $N_p \times N_p$ is the matrix for equalisation coefficients.

The mono-user detection techniques consist of detecting the useful signal without taking into account interference between users. After operation of the Direct Fourier Transform, the signal received is equalised in the frequency domain by multiplying each symbol received by a coefficient $g_k$ belonging to each sub-carrier, with the aim of compensating the attenuation $\tilde{n}_k$ and the de-phasing $\grave{e}_k$ introduced by the channel at the frequency under consideration.

The different detection methods are the following (non-limiting list):

"Maximum Ratio Combining" (MRC): the MRC method is optimum relative to the error level in the case where a single user is active. It consists of multiplying each symbol by the conjugated complex response of the channel:

$$g_k = h_k^* \tag{4}$$

"Equal Gain Combining" (EGC): the EGC detection technique only corrects the phase distortion of the channel:

$$g_k = h_k^*/|h_k| \tag{5}$$

"Orthogonality Restoring Combining" (ORC) or "Zero Forcing" (ZF): the ORC technique makes it possible to eliminate integrally the interference between users by restoring orthogonality between the different spread codes. In this case, the coefficients are equal to:

$$g_k = 1/h_k \tag{6}$$

However, the main disadvantage of this method is that, for low amplitudes $h_k$, the multiplication by an inverse function of the channel results in high amplification of noise, which rapidly degrades the error level.

"Controlled equalisation" (CE) or "Threshold ORC" (TORC): the CE technique consists of multiplying the signal received by the inverse function of the channel only when the module $|h_k|$ of the frequency response of the channel for the carrier concerned exceeds a certain threshold. An improvement of this procedure can be obtained by applying the EGC for the carriers which have been greatly attenuated, which makes it possible to compensate for the distortion of the channel phase for the sub-carriers under consideration.

2.3.2 The Classic Detection Technique According to the Criterion of the "Minimum Mean Square Error" or MMSE.

The equalisation traditionally proposed in MC-CDMA according to the MMSE criterion is aimed at minimising independently, on each carrier k the mean square error value $\epsilon_k$ between the signal transmitted $s_k$ and its estimate $\hat{s} = g_k r_k$ generated at the output from the equaliser:

$$J = E\{|\epsilon_k|^2\} = E\{|s_k - g_k r_k|^2\} \tag{7}$$

When the number of users is equal to the length $L_c$ of the code, the coefficients of the equaliser according to the criterion of minimum mean square error are equal to:

$$g_k = \frac{h_k^*}{|h_k|^2 + 1/\gamma_k} \tag{8}$$

where $\gamma_k$ is the signal to noise ratio for the sub-carrier k. When the number of users $N_u$ is lower than the length $L_c$ of the code, the equaliser coefficients according to the minimum mean square error criterion are equal to:

$$g_k = \frac{h_k^*}{|h_k|^2 + \frac{L_c}{N_u} \cdot \frac{1}{\gamma_x}} \tag{9}$$

where $\gamma_x$ is the signal to noise ratio of the transmitted signal x.

This is described in particular in the document by S. Kaiser, "Analytical performance evaluation of OFDM-CDMA mobile radio systems" (Proceedings First European Personal and Mobile Communications Conference (EP-MCC'95), Bologna, Italy, November 1995, pp 215–220).

In the same way as for the other detection techniques, the equalisation function is thus carried out on each sub-carrier independently by multiplying, in the frequency domain, each of the $N_p$ symbols generated at the output from the FFT by a single coefficient $g_k$ belonging to each sub-carrier.

AIM OF THE INVENTION

The particular aim of the invention is to propose a new technique for equalisation, or for detection, which is more efficient than the techniques known from prior art described above in MC-CDMA, in particular when the system is not operating at full load, that is to say when the number of users is less than the length $L_c$ of the spread code.

SUMMARY OF THE INVENTION

This aim, together with others which appear more clearly below, is achieved with the help of a method for reception of a signal implementing a modulation with multiple carriers and with multiple access through code division, of the type comprising a stage of demodulation by application of a mathematical transform from the temporal domain to the frequency domain, a stage of equalisation (or detection) of the transformed signal, and a stage of de-spreading of the treated signal.

According to the invention, said equalisation stage takes into account, for each of the components of said transformed signal, the disturbances affecting the carrier carrying said component and at least one other of said carriers and at least some of said spread codes.

Thus, equalisation is carried out according to an approach different from prior art techniques, which rely simply on the application of a multiplication coefficient on each component. According to the invention, the disturbances of the transmission channel are taken into account as a whole, or at least the disturbances due to some of these carriers. It is verified that this technique makes it possible to obtain better results, particularly when the system is not operating at full load.

Thus, the invention concerns a technique for equalisation, which minimises the mean square error for the received signal as a whole, by integrating the de-spreading functions into it. This approach requires thus taking into account the different spread codes of the active users.

Advantageously, said equalisation stage implements an equalisation matrix containing the equalisation coefficients of the transmission channel, at least some of the coefficients other than the coefficients of the diagonal of the matrix sometimes being non nil.

It is therefore simple to put the technique according to the invention into operation, in the receivers.

Advantageously, the coefficients of said weighting matrix are determined according to the Wiener filtering technique applied globally over the whole of the signal received, taking into account the de-spreading functions.

This weighting matrix can thus be written:

$$G = H^* \cdot \left( H \cdot C \cdot A \cdot C^T \cdot H^* + \frac{\sigma_N^2}{E_S} \cdot I \right)^{-1} \quad (14)$$

with: H=matrix representative of the transmission channel;
C=matrix of the spread codes;
A={$a_{jj}$}: diagonal matrix with $a_{jj}$ non nil if the user j is active;
$\sigma_N^2$ noise variance affecting each sub-carrier;
$E_S$={$x_j^2$}: power of received signals;
I=the identity matrix.

When $\sigma_N^2/E_S$ tends towards 0, it may happen that this matrix is not reversible. In order to overcome this problem, one can envisage that the estimated quantity $\sigma_N^2/E_s$ may be compared to a threshold value, and replaced by said threshold value when it is lower than the latter.

Advantageously, one can also envisage that, when the estimated quantity $\sigma_N^2/E_s$ is lower than a threshold value, one implements an alternative detection technique, such as the so-called ORC technique.

Another advantageous solution to this problem consists of determining said weighting matrix with the aid of an iterative procedure implementing a gradient algorithm.

When the reception process implements a non-linear multi-user detection technique of the parallel and/or series annulment type, (the different spread codes for multiple users being known by the receiver), the same equalisation technique is used advantageously in a stage for annulment of multiple access interference, due to other users.

In this case, the said annulment stage can be iterative, and comprise at least two successive equalisation steps.

The method according to the invention can thus comprise the following stages:
  an initial stage producing an estimate of multi-user interference;
  a subtraction stage of said estimate of multi-user interference from the received signal;
  an equalisation stage on the corrected signal thus obtained.

The invention also concerns the equalisation method implemented in the reception process described above, together with provisions for reception applying these procedures.

5 LIST OF FIGURES

Other characteristics and advantages of the invention will be seen more clearly by reading the description below of a preferred embodiment of the invention, given as a simple illustrative and non-limiting example, and the attached drawings among which.

6 DESCRIPTION OF A PREFERRED EMBODIMENT

6.1 The New Detection Technique Proposed (Matrix MMSF)

This new detection technique thus has the aim of minimising the mean square error globally over the received signal as a whole. If one calls $W_j = [w_j^0, w_j^1, \ldots, w_j^{N_p}]$ the optimum weighting vector, the symbol given to the $j^{th}$ user can be written:

$$\hat{x}_j = W_j^T \cdot R = C_j^T \cdot G \cdot R \quad (10)$$

It can thus be noted that one takes into account de-spreading functions during this operation of minimisation of the mean square error.

According to Wiener filtering, applied to the received signal as a whole, the optimum weighting vector is equal to:

$$W_j = \Gamma_{R,R}^{-1} \cdot \Gamma_{R,x_j} \quad (11)$$

where $\Gamma_{R,R}$ is the autocorrelation matrix of the vector R received and $\Gamma_{R,xji}$ is the intercorrelation vector between the symbol $x_j$ and the vector of the received signal R. These quantities are equal to:

$$\Gamma_{R,R} = E^*\{R^* \cdot R^T\} \cdot^* \cdot = H^* \cdot C \cdot E \cdot^*\{X^* \cdot X^T\} \cdot^* \cdot C^T \cdot H + E^*\{N^* \cdot N^T\} \Gamma_{R,xi} = E^*\{R^* \cdot x_j\}^* = H^* \cdot C \cdot E^*\{X^* \cdot x_j\} \quad (12)$$

where ( )* means conjugated complex. The optimum weighting vector is then equal to:

$$W_j^T = E\{x_j \cdot X^{*T}\} \cdot C^T H^* \cdot (H \cdot C \cdot E\{X \cdot X^{*T}\} \cdot C^T \cdot H^* + E\{N \cdot N^{*T}\})^{-1} \quad (13)$$

If the different noises affecting the sub-carriers have the same variance and are independent, then $E\{N \cdot N^{*T}\} = \sigma_N^2 \cdot I$ where I is the identity matrix. If the different user signals have the same power ($E\{x_j^2\} = E_S$ and are independent, one can write that $E\{X \cdot X^{*T}\} = E_S A$, here $A = \{a_{jj}\}$ is a diagonal matrix with $a_{jj}=1$ if the user j is active and $a_{jj}=0$ if the user j is inactive. The matrix for the equalisation coefficients is then equal to:

$$G = H^* \cdot \left( H \cdot C \cdot A \cdot C^T \cdot H^* + \frac{\sigma_N^2}{E_S} \cdot I \right)^{-1} \quad (14)$$

Evidently, the conditions described in the preceding paragraph for the variance and independence of noise affecting the different sub-carriers on the one hand and for the power of the signals are completely unnecessary for validating the approach.

In the case of full load ($N_u = L_c$), and when orthogonal codes are used such as Walsh-Hadamard codes, the quantity $C.A.C^T_S$ equal to the identity matrix and the matrix G of the equalisation coefficients is then a diagonal matrix with the equalisation coefficient of the $k^{th}$ sub-carrier equal to the expression (8) given above. It must be noted that, in the given example, the reception powers are the same for all users.

Figure 2:
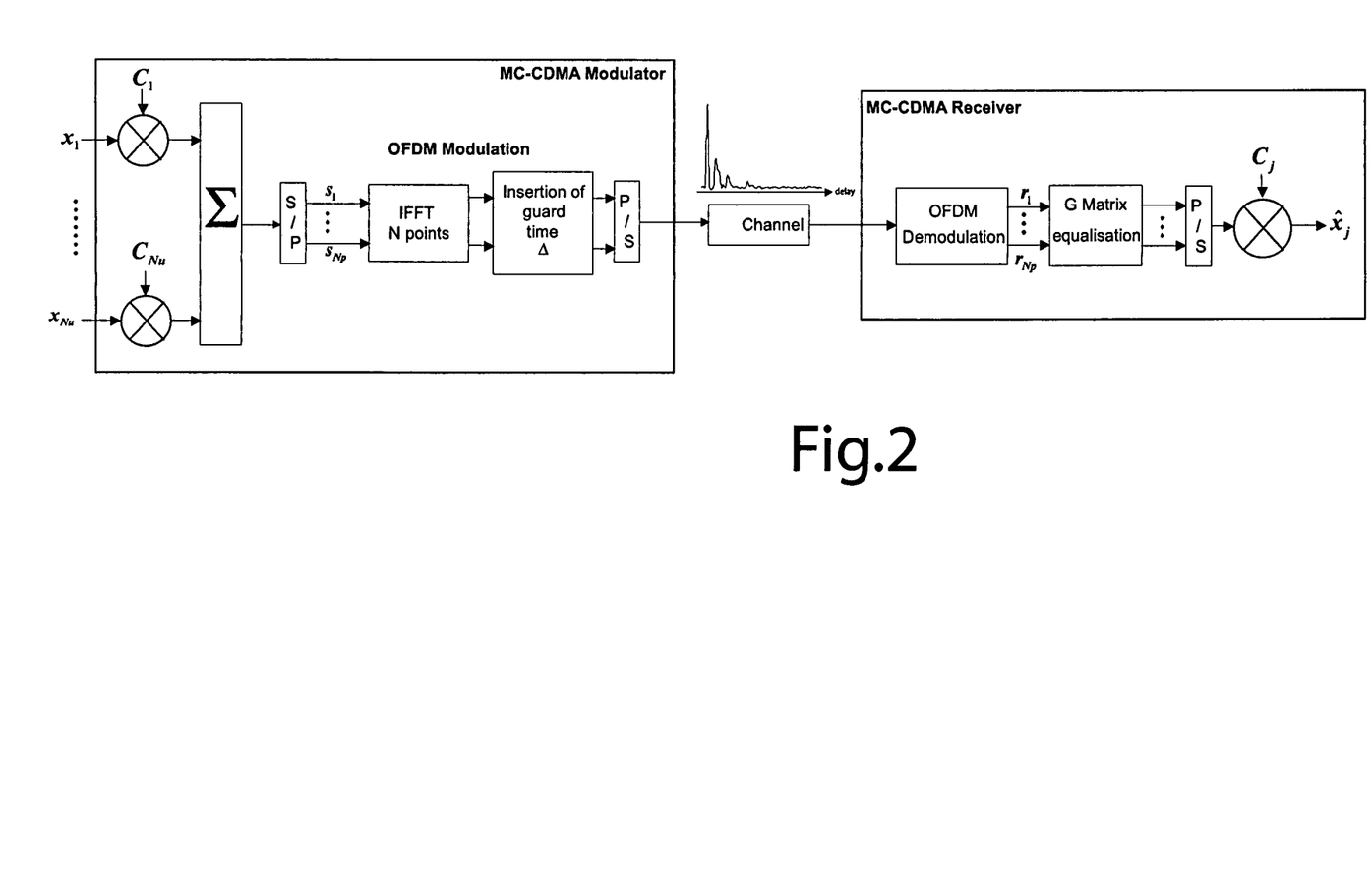
FIG. 2 shows a general overview diagram of an MC-CDMA transmission and reception channel according to the invention.

On the other hand, in all the cases where $N_u < L_c$ the quantity $C.A.C^T$ is not an identity matrix and the G matrix for the equalisation coefficients is not a diagonal matrix. The receiver proposed then complies with the diagram of FIG. 2.

If the reception power of the signals from different users is not the same for all users, the new approach remains optimum relative to the MMSE criterion. In this case the calculation leads to a matrix A, still diagonal if all the users are independent, but for an active user j, $a_{jj}$ can be different from 1.

Contrary to the approach according to the invention, prior art technique according to the MMSE criterion leads to a non-optimum equation (8) in cases where operation is not at full load, and even in the case of full load, this approach is not optimum relative to the MMSE criterion if the power of the different users is not identical.

The matrix G is a dimensional matrix $N_p \times N_p$. The method proposed thus consists not of multiplying each symbol generated at output from the FFT by a coefficient accorded to each sub-carrier, but of treating the signal vector R as a whole in conformity with the preceding calculation by multiplying it by the matrix G.

This new detection technique requires knowledge of the different spread codes of the multi-users, and accordingly, it can be classified among the linear type multi-user detection techniques.

Direct application of the equation (14) requires inverting the matrix corresponding to the denominator of this equation. In certain cases, in particular when the quantity $\sigma_N^2/E_S$ tends to zero, which is verified when the signal to noise ratio is very high, the matrix as expressed by the equation (14) may not be reversible.

A first possibility for overcoming this disadvantage consists of using a threshold device in such a way that the estimated quantity $\sigma_N^2/E_S$ is limited and thus equal at least to a value optimised by taking into account the precise parameters of the system under consideration. In this case, the matrix is always reversible.

A second possibility for overcoming this disadvantage consists of using, when the estimated quantity $\sigma_N^2/E_S$ tends to zero, another detection technique such as, for example, the Orthogonality Restoring Combining method (ORC) described in paragraph 2.3.1.

Moreover, an alternative to the matrix inversion for implementing the proposed detection technique, called matrix MMSE, is to use an iterative process, relying on a gradient algorithm such as Last Mean Square (LMS), for example. In this case, the minimisation of the mean square error according to Wiener filtering, makes it possible to obtain optimum coefficients, after several iterations, for the equalisation matrix G given by equation (14).

6.2 Application to Non-linear Detection Techniques with Interference Annulment.

Figure 4:
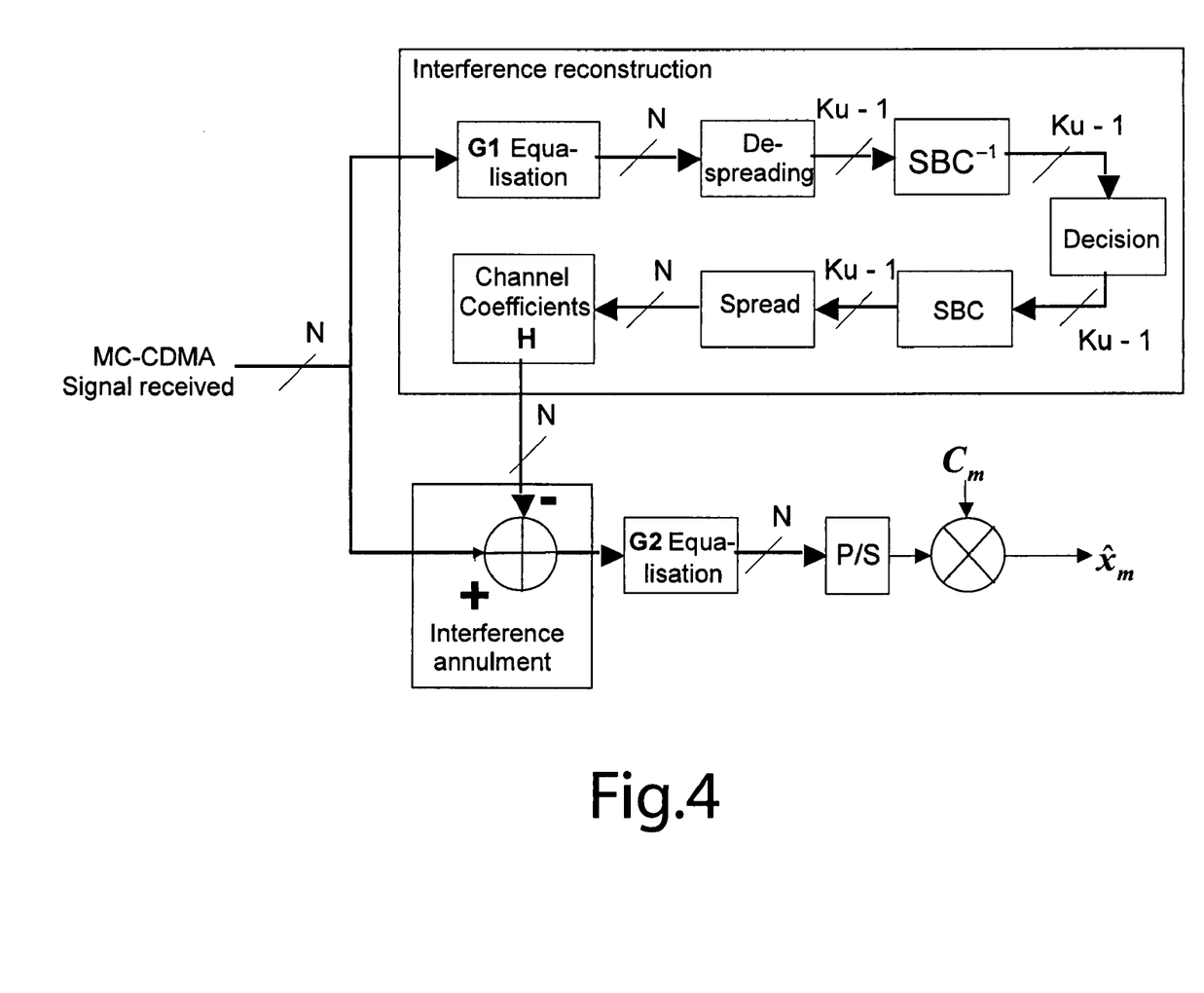
FIG. 4 shows a general overview diagram of an MC-CDMA non-linear multi-user receiver with annulment of parallel interference.

There are three main categories of multi-user detectors: Maximum Likelihood Detectors (MLD), linear detectors such as the detector described above, and non-linear detectors with interference annulment. In this paragraph, particular attention is given to this third category. Detectors with interference annulment of parallel type such as shown in FIG. 4, as well as the detectors with interference annulment of the series type seek to estimate the interference due to other signals in order to delete this multi-user interference from the received signal. This procedure can be implemented in an iterative way, with the aid of several successive detection stages. Different mono-user detection techniques can thus be combined at different stages. The new method proposed for implementing the MMSE detection algorithm can also be chosen at each stage of a multi-user detector with interference annulment. In this case, the matrix A of the equation (14) must be optimised in a specific way at each step. Thus it becomes possible to combine linear and non-linear multi-user detectors.

As an example, FIG. 4 shows a diagram of the principle of a detector with interference annulment of the parallel type with two steps implementing the new detection technique proposed. In the initial step, the symbols of the $K_u-1$ other active users are detected in parallel by implementing the new matrix MMSE algorithm (equalisation matrix G1). Thus, it is possible, after de-spreading, through de-mapping (SBC$^{-1}$), decision taking, mapping, (SBC—Signal Binary Code), the spread and multiplication by the matrix H of the channel coefficients to obtain an estimate of the multi-user interference which is then subtracted from the received signal. The second step next carries out the final detection by using once again the new matrix MMSE algorithm (equalisation matrix G2).

6.3 Examples of Results

The results presented are obtained with independent Rayleigh procedures and with the same power for each sub-carrier, the channel being considered frequency non-selective on each of these sub-carriers. The Gaussian additive white noise is also generated by procedures of the same power and independent for each sub-carrier. The codes used are Walsh-Hadamard and the signal binary coding is that of an MDP4.

Figure 3:
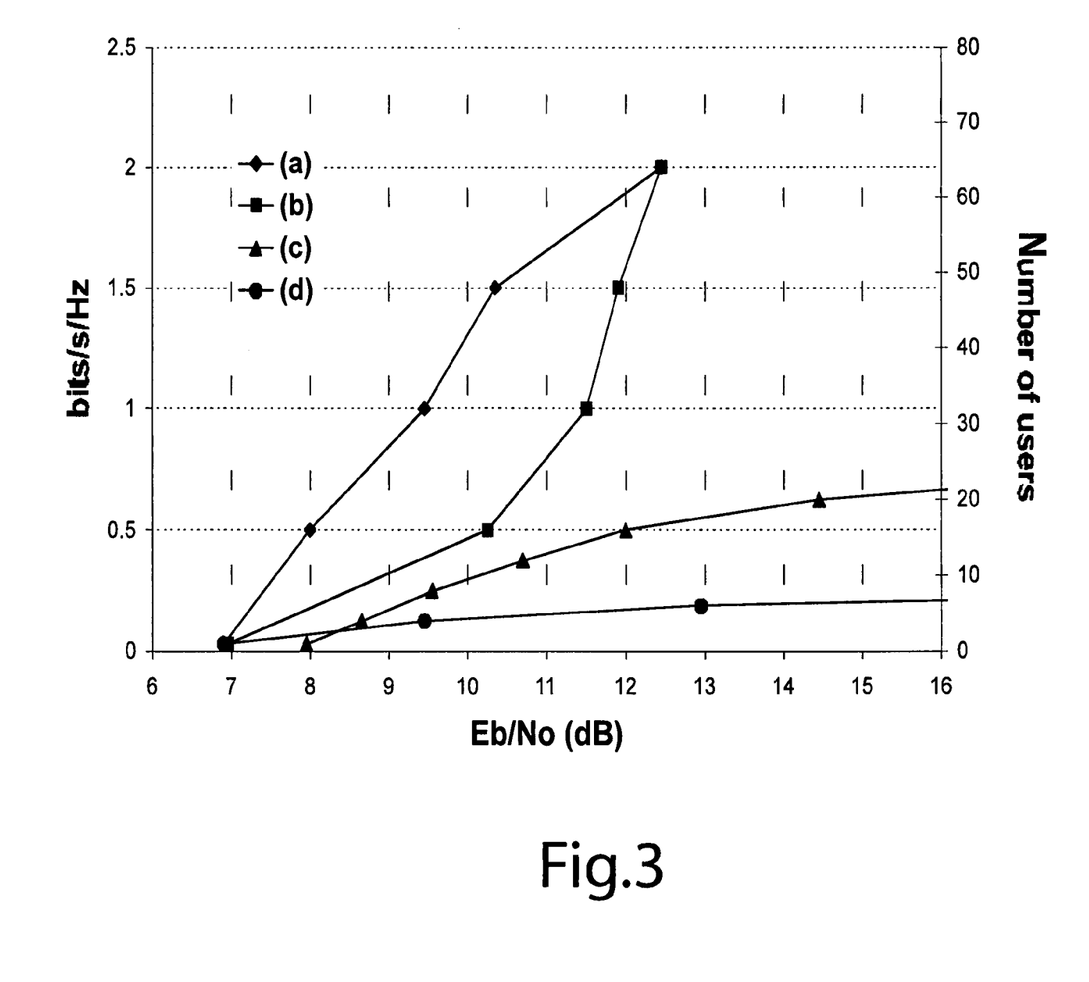
FIG. 3 is a comparison of the performance of different techniques for linear detection.

FIG. 3 shows the performance of different mono-user detection techniques with $L_c=N_p=64$ taking into account the spectral efficiency of the ratio $E_0/N_0$ needed to obtain a BER=$10^{-3}$. The maximum spectral efficiency is equal to 2 bit/s/Hz corresponding to a full load system (Nu=Lc=$N_p$), since the losses due to the guard time, the synchronisation and channel estimation (pilot carriers for example) are not taken into account.

Curve (b) shows the performance of the traditional MMSE system with equalisation coefficients optimised independently on each sub-carrier in conformity with the equation (9) with one coefficient per sub-carrier. Curve (a) corresponds to the performance of the new MMSE system using the matrix approach with equalisation matrix coefficients given by the equation (14). At full load ($N_u$=64) the performance of the two MMSE systems are identical. On the other hand, when the system is not fully loaded ($N_u$<64), the new matrix MMSE system provides a gain of about 2 dB for $N_u$=32 and 16, which corresponds to a spectral efficiency equal respectively to 1 and 0.5 bit/s/Hz.

What is claimed is:

1. Method for reception of a signal implementing a modulation with multiple carriers and with multiple access by division of spread codes, of the type comprising a de-modulation stage by application of a mathematical transform from the temporal domain to the frequency domain, an equalisation stage of the transformed signal and a de-spreading stage of the equalised signal, characterised in that said equalisation stage comprises, for each of the components of said transformed signal, at least one equalisation element representative of disturbances affecting the carrier carrying said component, at least one equalisation element representative of disturbances affecting at least one other of said carriers, and at least one element representative of some of said spread codes.

2. Reception method according to claim 1, characterised in that said equalisation stage implements an equalisation matrix carrying equalisation coefficients representative of the transmission channel, at least certain of the coefficients other than the coefficients of the diagonal of the matrix sometimes being non nil.

3. Reception method according to claim 2, characterised in that the coefficients of said weighting matrix are determined according to the Wiener filtering technique applied globally over the received signal as a whole, taking into account the de-spreading functions.

4. Reception method according to claim 3, characterised in that said weighting matrix is written $$G = H^* \cdot \left( H \cdot C \cdot A \cdot C^T \cdot H^* + \frac{\sigma_N^2}{E_S} \cdot I \right)^{-1}$$

with: H=matrix representative of the transmission channel;
C=matrix of the spread codes;
A={$a_{jj}$}: diagonal matrix with $n_{jj}$ non nil if the user j is active;
$\sigma^2_N$=noise variance affecting each sub-carrier;
$E_S$=mean power of received signals;
I=the identity matrix.

5. Reception method according to claim 4, characterised in that the estimated quantity $\sigma^2_N/E_S$ is compared to a threshold value, and replaced by said threshold value when it is lower than the latter.

6. Reception method according to claim 4, characterised in that one implements an alternative detection method when the estimated quantity $\sigma^2_N/E_S$ is lower than a predetermined threshold value.

7. Reception method according to claim 3, characterised in that said weighting matrix is determined with the aid of an iterative procedure implementing a gradient algorithm.

8. Reception method according to claim 1, of the type implementing a multi-user detection technique, according to which the different spread codes of the multiple users are known from the receiver, characterised in that the same equalisation technique is also used in a stage for annulment of multiple access interference.

9. Reception method according to claim 8, characterised in that said interference annulment stage is iterative, and comprises at least two successive equalisation steps.

10. Reception method according to claim 8, characterised in that it implements:
an initial stage producing an estimate of multi-user interference;
a subtraction stage of said estimate of multi-user interference from the received signal;
an equalisation stage on the corrected signal thus obtained.

11. Equalisation method implemented in the reception method according to claim 1.

12. Reception device implementing the method according to claim 1.

13. The method according to claim 11, wherein equalising disturbances is performed by an equalisation matrix carrying equalisation coefficients representative of the transmission channel, at least certain of the coefficients other than the coefficients of the diagonal of the matrix being non nil.

14. The method according to claim 13, characterised in that the coefficients of said equalisation matrix are determined according to the Wiener filtering technique applied globally over the received signal as a whole, taking into account the de-spreading functions.

15. The method according to claim 14, characterised in that said weighting matrix is $$G = H^* \cdot \left( H \cdot C \cdot A \cdot C^T \cdot H^* + \frac{\sigma_N^2}{E_S} \cdot I \right)^{-1}$$

where H=matrix representative of the transmission channel;
C=matrix of the spread codes;
A={$a_{jj}$}: diagonal matrix with $n_{jj}$ non nil if the user j is active;
$\sigma^2_N$=noise variance affecting each sub-carrier;
$E_S$=mean power of received signals;
I=the identity matrix.

16. The process according to claim 15, characterised in that the estimated quantity $\sigma^2_N/E_S$ is compared to a threshold value, and replaced by said threshold value when it is lower than the latter.

17. The receiver according to claim 12, further including an equalisation matrix carrying equalisation coefficients representative of the transmission channel, at least certain of the coefficients other than the coefficients of the diagonal of the matrix being non nil.

18. The receiver according to claim 17, characterised in that the coefficients of said equalisation matrix are determined according to the Wiener filtering technique applied globally over the received signal as a whole, taking into account the de-spreading functions.

19. The receiver according to claim 18, characterised in that said weighting matrix is $$G = H^* \cdot \left( H \cdot C \cdot A \cdot C^T \cdot H^* + \frac{\sigma_N^2}{E_S} \cdot I \right)^{-1}$$

where H=matrix representative of the transmission channel;
C=matrix of the spread codes;
A={$a_{jj}$}: diagonal matrix with $n_{jj}$ non nil if the user j is active;
$\sigma^2_N$=noise variance affecting each sub-carrier;
$E_S$=mean power of received signals;
I=the identity matrix.

20. The receiver according to claim 19, characterised in that the estimated quantity $Y^2_N/E_S$ is compared to a threshold value, and replaced by said threshold value when it is lower than the latter.

* * * * *